June 2, 1959  H. C. MAY  2,889,175
FLUID PRESSURE BRAKE APPARATUS
Filed May 18, 1955  2 Sheets-Sheet 1

INVENTOR.
Harry C. May
BY
Aubert A. Steinmiller
ATTORNEY

June 2, 1959 H. C. MAY 2,889,175
FLUID PRESSURE BRAKE APPARATUS
Filed May 18, 1955 2 Sheets-Sheet 2

Fig. 1B

INVENTOR.
Harry C. May
BY
Adelbert A. Steinmiller
ATTORNEY

United States Patent Office 2,889,175
Patented June 2, 1959

2,889,175
FLUID PRESSURE BRAKE APPARATUS

Harry C. May, East McKeesport, Pa., assignor to Westinghouse Air Brake Company, Wilmerding, Pa., a corporation of Pennsylvania Application May 18, 1955, Serial No. 509,198

14 Claims. (Cl. 303—59)

This invention relates to fluid pressure brake apparatus and more particularly to the type adapted for use on railway locomotives.

In United States Patent 2,322,042 granted to Glenn T. McClure on June 15, 1943 and assigned to the assignee of the present invention, there is shown and described a brake apparatus of the above type, which is substantially identical with the commercial No. 24–RL locomotive brake apparatus.

In apparatus of the 24–RL type it is customary to provide fading maintaining of brake pipe pressure when an engineer's brake valve device is in first service position and a first service cock is in an open position; "fading maintaining" referring to maintaining brake pipe pressure sufficiently against permissible leakage to assure that brake pipe pressure will reduce at the rate at which pressure in an equalizing reservoir reduces by way of a so-called fading choke during the light brake application effected in first service position of said brake valve device.

One object of the invention is to provide an improved brake apparatus adapted to provide fading maintaining under the above condition, and also to optionally provide flat maintaining of brake pipe pressure against leakage when the brake valve device is in service and lap positions; "flat maintaining" referring to maintenance of brake pipe pressure during a brake application at a value substantially equal to the chosen reduced pressure then prevailing in the equalizing reservoir, as will hereinafter be more fully described.

Another object is to provide an improved brake apparatus of the type described characterized by a novel first service cut-off valve device whereby supply of fluid under pressure from a charged first suppression reservoir to a suppression valve device is prevented if the first service cut-off valve device is in closed position, for thereby preventing an improper suppression of an automatic train control brake application, as will hereinafter be more fully described.

Another object is to provide an improved brake apparatus of the type described and embodying an improved brake pipe cut-off valve device, first service cut-off valve device, cut-off valve device, and equalizing valve device, all of which valve devices are adapted to be associated with an improved engineer's automatic brake valve device.

A further object of the invention is to provide an improved and relatively low cost commercial brake apparatus of the above general type, which embodies desirable features of the No. 24–RL brake apparatus and also provides improvements thereto.

Other objects and advantages will become apparent from the following more detailed description of the invention and from the accompanying drawings, wherein Figs. 1A and 1B, when taken together, such that the right-hand edge of Fig. 1A is matched to the left-hand edge of Fig. 1B constitute a diagrammatic view of a fluid pressure brake apparatus embodying the invention; and Fig. 2 is a diagrammatic development view showing connections effected between various passages in a rotary valve seat upon movement of a rotary valve, shown in Figs. 1A and 1B, to certain designated positions.

DESCRIPTION

Figures 1A, 2:
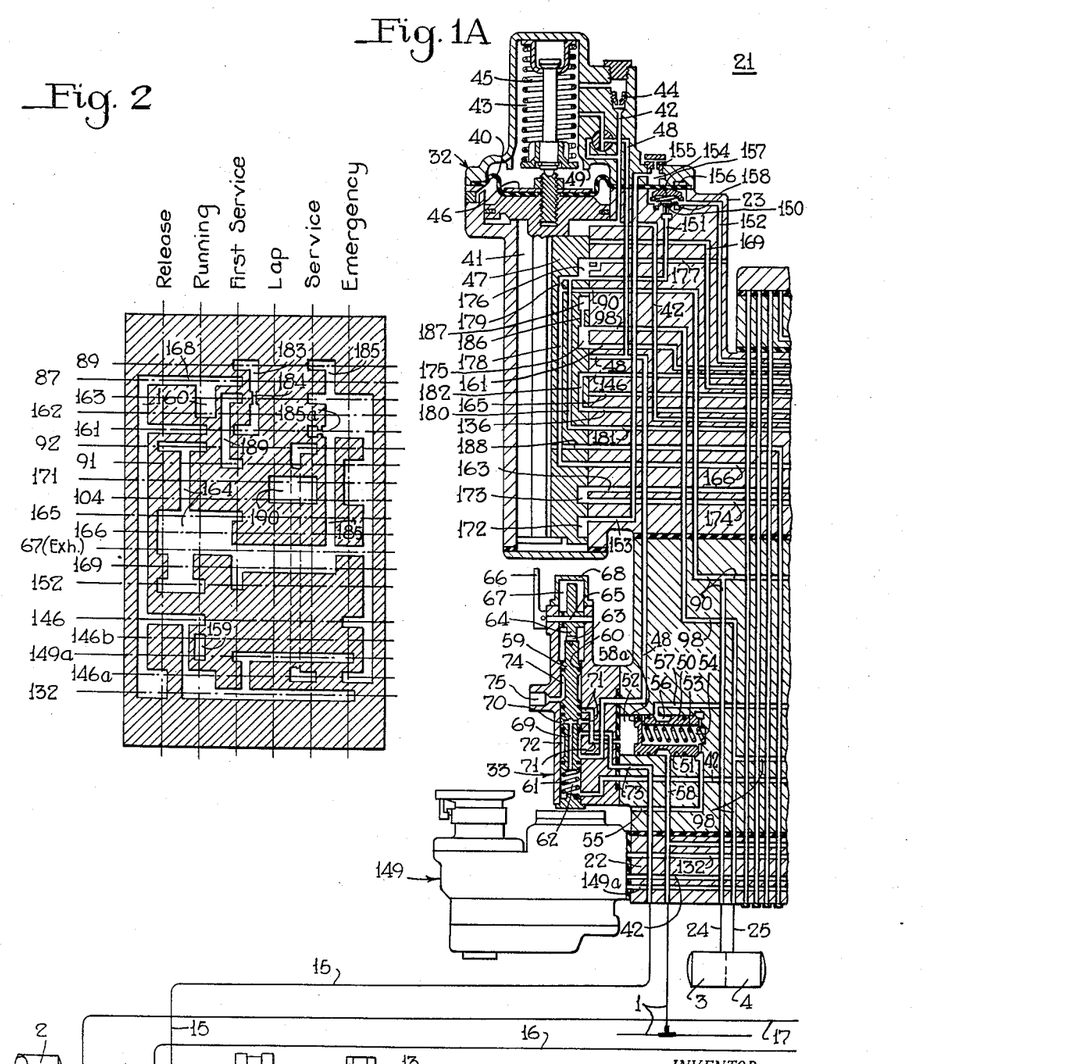
Figure 1B:
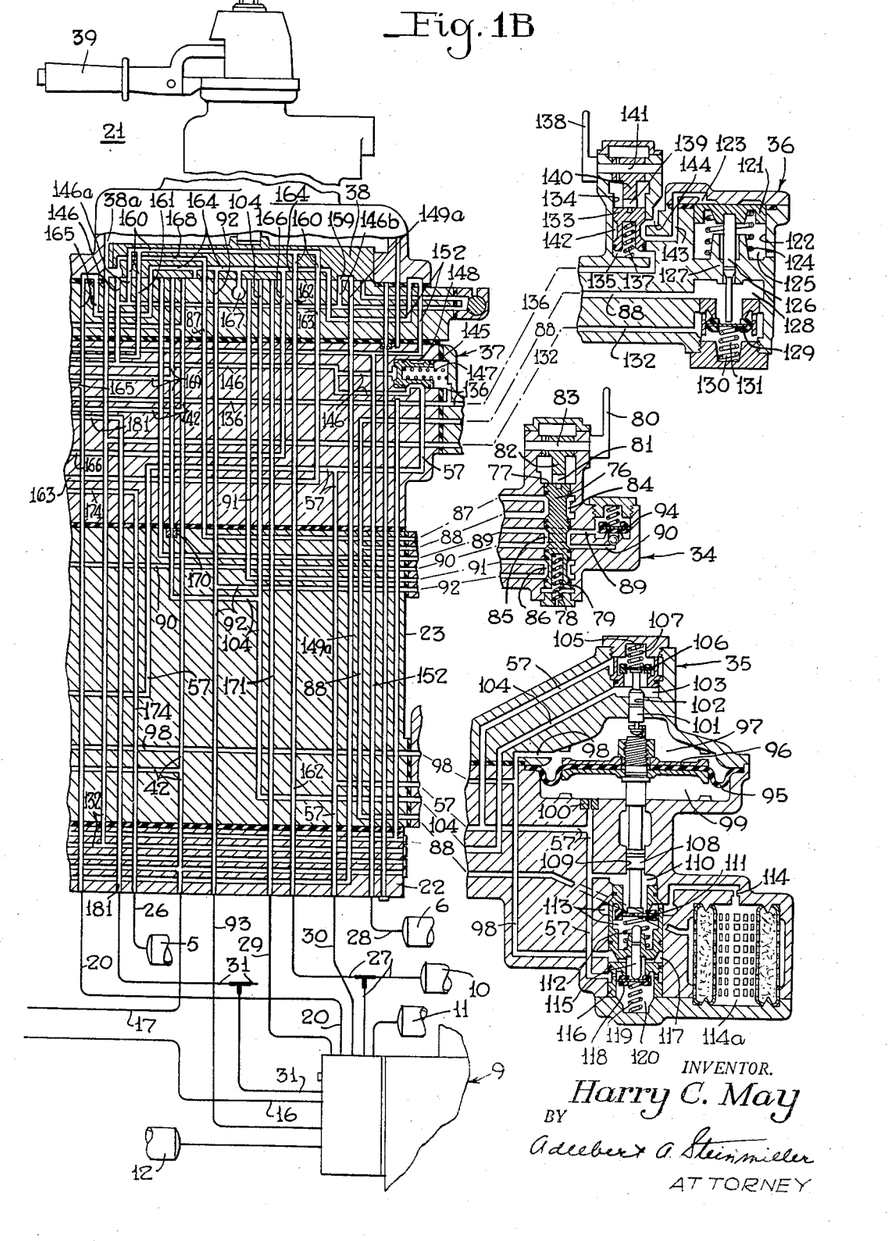

The accompanying drawings show an improved fluid pressure brake apparatus of the type shown and described in the aforementioned patent and comprising a brake pipe 1, a main reservoir 2, a reduction limiting reservoir 3, an equalizing reservoir 4, a first or temporary suppression reservoir 5, a second reduction reservoir 6, a timing valve device 7 with which is associated a timing reservoir 8, and a suppression valve device 9 with which is associated a suppression reservoir 10 and a stop reservoir 11 and a timing reservoir 12. The various reservoirs just described perform the same functions as in the commercial 24–RL brake equipment described in said patent.

The timing valve device 7 may be identical with that shown and fully described in the aforementioned patent and therefore will be only briefly and functionally described. This timing valve device 7 comprises, briefly, valve means (not shown) controlled by an electro-magnet 13 which in turn is controlled through the train stop signal circuits (not shown) and is normally energized but is adapted to be deenergized when the train enters a restricted speed zone at a speed in excess of that prescribed or when a prescribed speed is exceeded or a train stop is called for. So long as the magnet 13 is energized, fluid under pressure supplied to the timing valve device 7 via a pipe 14 will maintain the timing reservoir 8 charged and thus maintain a fluid pressure operated valve means (not shown), which is controlled by timing reservoir pressure, in a cut-off position for preventing release of fluid under pressure from a train control application pipe 15 and for also opening to atmosphere a pipe 16 leading to the suppression valve deivce 9; said pipe 14 being charged with fluid at a preselected reduced pressure from the main reservoir 2 via a main reservoir pipe 17 and a reducing valve device 18 which may be of any well-known type.

Upon deenergization of the magnet 13, supply of fluid under pressure to the timing reservoir 8 via the pipe 14 will be cut off and timing reservoir pressure will blow down at a controlled rate and also actuate a pneumatically operated whistle 19 for warning the engineer that a train control brake application is imminent. If, upon receiving the warning, the engineer fails to promptly effect a manual brake application of sufficient degree to reduce train speed to or below the prescribed speed, pressure of fluid in the timing reservoir 8 will, within a chosen period such as six seconds, blow down sufficiently to cause the aforementioned fluid pressure operated valve means to move from its cut-off position to an application position; whereupon the pipe 16 will be cut off from atmosphere and the train control application pipe 15 will be vented to atmosphere by way of the pipe 16 and a communication hereinafter to be described for causing an automatic train control application of brakes in the manner hereinafter to be explained.

The suppression valve device 9 may be identical with that shown and fully described in the aforementioned patent and known commercially as the "A–1 suppression valve," and will therefore be only briefly and functionally described during subsequent description of operation. This valve device is adapted to provide both temporary and permanent suppression of an automatic train control brake application provided the operator responds to the warning given by the whistle 19.

The brake apparatus also comprises an improved engineer's automatic brake valve device 21 which comprises a pipe bracket 22 on which is mounted a sectionalized casing 23. To the pipe bracket are connected the pipes 15, 1, and 17, as well as pipes 24, 25, 26, 27 and 28, which consecutively numbered pipes lead to the reduction limiting reservoir 3, equalizing reservoir 4, first suppression reservoir 5, suppression reservoir 10 and second reduction reservoir 6, respectively. To the pipe bracket 23 are also connected three pipes 20, 29, 30 leading to the suppression valve device 9 for reasons hereinafter to be explained. Also connected to the pipe bracket is a pipe 31, respective branches of which lead to the suppression valve device 9 and to the usual power knock-out device (not shown); the latter device being of the usual type used with electric and diesel electric locomotives for cutting off power during a train control brake application so as to prevent burning out of the commutators.

Preferably formed integrally with, and in part defined by, the various sections of casing 23 are a service application valve device 32, an improved brake pipe cut-off or double heading valve device 33, an improved first service cut-off valve device 34, an improved equalizing valve device 35, a novel brake pipe flat maintaining valve device 36 and an improved cut-off valve device 37. The brake valve device 21 also comprises a rotary valve 38 that is rotatable by a handle 39 to various positions (designated in Fig. 2 and hereinafter to be described); said valve element being mounted in a chamber 38a and slidable relative to a seat formed in the casing 23.

The service application valve device 32 is provided for causing an automatic service application of brakes in response to venting of the train control application pipe 15. This valve device comprises, briefly, a flexible diaphragm 40 suitably clamped about its outer edge between sections of the casing 23 and subject at one side to pressure of fluid in a chamber 41 that is connected via a passage 42 to the main reservoir pipe 17 and subject at the opposite side to pressure of fluid in a chamber 43 that is connected via a removable choke fitting 44 to a branch of said passage 42 for permitting pressure in the chamber 43 to equalize at a controlled rate with pressure of fluid in the chamber 41.

A relatively heavy helical spring 45, disposed in chamber 43 and acting through the medium of a follower assemblage 46, urges the diaphragm 40 and also a slide valve 47 to respective normal or release positions, in which they are shown in the drawing; said slide valve being slidably mounted in the chamber 41 and positively connected to said follower assemblage. Connected to the chamber 43 is a train control application passage 48 which is normally closed off from atmosphere; but, upon venting of said passage and hence said chamber, the diaphragm 40 is adapted to deflect against resistance of the spring 45 and shift the slide valve 47 to an application position, defined by engagement of the follower assemblage 46 with a stop surface 49 in chamber 43, for thereby causing a train control brake application, in the manner hereinafter to be described. The various fluid pressure connections established by the slide valve 47 in its normal and application positions will be described subsequently.

The improved brake pipe cut-off or double heading valve device 33 is provided for permitting double heading operation of the locomotive by cutting off the brake pipe from the brake valve device 21 and also cutting out the train control feature on the particular locomotive. The cut-off valve device 33 comprises a generally cylindrical, spool-type cut-off valve 50 slidably mounted in a bore 51 in the casing and subject at one end to pressure of fluid in a chamber 52 and at the opposite end to pressure of a helical spring 53 in a chamber 54 constantly open to atmosphere via a vent passage 55 in said casing. When the chamber 52 is charged, the cut-off valve 50 is adapted to assume an open or cut-in position, in which it is shown, and in which an elongated annular cavity 56 formed in said valve connects a passage 57 open to the pipe 30 with a brake pipe passage 58 constantly open to the brake pipe 1. Formed in the cut-off valve 50 between the end adjacent chamber 52 and the cavity 56 is an opening 58a which leads from the bore 51 to atmospheric chamber 54 for bleeding off to atmosphere any fluid under pressure which may leak from chamber 52 along the bore 51, so as to thereby prevent an undesired buildup in brake pipe pressure in passage 57.

For controlling pressure of fluid in the chamber 52 there is provided a pilot mechanism including a spool-type pilot valve 59 slidably and sealingly mounted in a bore 60. The valve 59 is subject at one end to pressure of a helical spring 61 in a chamber 62, and at the opposite end engages a pivotable thrust member 63 which in turn engages a cam 64 that is operably connected by a suitably keyed connecting pin 65 to a pilot handle 66; said cam 64 being disposed in a chamber 67 suitably enclosed by a cap member 68. Both the cut-off valve 50 and spool valve 59 have annular grooves suitably spaced, as shown in the drawings, for accommodating O-ring type seals that sealingly engage the walls of the respective bores 51, 60 for preventing leakage along said bores and between the cavities and openings above described. When the pilot handle 66 is in an open position, the cam 64 is disposed as to permit the spring 61 to hold the spool valve 59 in an open position, in which it is shown, and in which position fluid under pressure can flow via the main reservoir passage 42, chamber 62, and an axial opening 69 and a radial port 70 formed in said spool valve to a passage 71 leading to the chamber 52, for shifting the cut-off valve 50 to its cut-in position; and also an elongated annular groove 72 in said spool valve connects the passage 48 to a passage 73 leading to the train control application pipe 15.

In order to condition the brake valve device 21 of a particular locomotive for double heading operation, the handle 66 is rotated, without pause, through an intermediate position (hereinafter to be defined) to a closed position, causing the cam 64 to operatively shift the spool valve 59 against resistance of spring 61 to a closed position, in which passage 48 is disconnected from the passage 73 and both passages 48 and 73 are lapped by said spool valve; and also in this position, an elongated annular cavity 74 in said spool valve connects two branches of the passage 71 to an atmospheric port 75 for thereby venting chamber 52 and causing spring 53 to shift the cut-off valve 50 to a cut-off position in which the passage 57 is disconnected from the passage 58 and brake pipe 1.

Following a double heading operation, in order to again condition the brake valve device 21 on a particular locomotive to control brakes according to position of the brake valve handle 39, the handle 66 of the brake pipe cut-off valve device 33 is rotated from its closed position toward open position, causing the cam 64 to correspondingly rotate and permit spring 61 to shift the spool valve 59 upwardly until the pivotable member 63 engages a detent or notch in said cam, thereby defining the intermediate position of said handle and spool valve. In this position of the spool valve 59, fluid at main reservoir pressure is supplied via passage 42, opening 69, and port 70 to the passage 73 for assuring that pipe 15 will be recharged (before it is connected to passage 48) in the event said pipe had been vented due to intervening de-energization of the timing valve magnet 13; and also in this position, passage 48 is blanked off and chamber 52 is maintained vented via one of the branches of passage 71, cavity 74 and atmospheric port 75. Within a few, such as 3 to 4 seconds during which pipe 15 will be recharged, the handle 66 is moved from intermediate to open position for causing the cut-off valve 50 to shift to its cut-in position, as above described. It should be noted that unless the handle 66 is maintained in intermediate position for the prescribed period during movement from closed to open position (to allow pipe 15 to be recharged if it was vented due to above-mentioned intervening de-energization of magnet 13), pressure in the chamber 43 of the service application valve device 32 may be reduced sufficiently, via passage 48, cavity 72, passage 73 and pipe 15, to cause the service slide valve 47 to shift to its application position and thereby cause an undesired application of brakes. However, the handle 66 may be moved from open to closed position in one rapid operation and without such pause in intermediate position.

It will thus be seen that the improved cut-off valve device 33 desirably eliminates the special locking handle heretofore proposed to require pausing in an intermediate position to assure precharging of the train control application pipe and which handle had to be pulled out before the operator could complete movement of the cut-out valve to either open or closed position.

The improved first service cut-off valve device 34 provides for cut-in or cut-out of the first service feature and also cooperates with the rotary valve 38 to prevent an improper suppression of a train control brake application in the manner to be explained subsequently. The valve device 34 comprises a spool-type valve 76 which is slidably mounted in a bore 77 and subject at one end to pressure of a helical spring 78 in an atmospheric chamber 79 and at the opposite end is operably connected to a handle 80 through the medium of a pivotable thrust member 81, cam 82 and connecting pin 83, preferably similar to those of the valve device 33 and above described. The valve 76 has three spaced apart, elongated annular grooves or cavities 84, 85, 86 preferably isolated from each other by O-ring type seals for preventing leakage along the bore 77.

When the handle 80 is in an open position, the spring 78 urges the valve 76 to an open position, in which it is shown, for cutting in the first service feature. With the valve 76 in open position, the groove 84 connects a passage 87 to a passage 88; the groove 85 connects a passage 89 to a passage 90 leading via the pipe 24 to the reduction limiting reservoir 3; and according to a feature of the invention, the groove 86 connects a passage 91 leading to the seat of the rotary valve 38 with a passage 92 leading via a pipe 93 to the suppression valve device 9 for reasons hereinafter to be explained. When the handle 80 is moved to a closed position, the cam 82 is adapted to shift the valve 76 to a closed position against resistance of spring 78 for disestablishing the respective connections just described and thereby cutting out the first service feature.

A spring loaded check valve 94 is interposed between branches of the passages 89, 90 in by-pass of the valve 76 for preventing flow from the passage 89 to the passage 90 when the valve 76 is in closed position but permitting flow in the reverse direction so that when said valve is in closed position, pressure of fluid in the reduction limiting reservoir 3 may be reduced if it is desired to make a reduction of a greater degree on top of that effected by a train control brake application.

It will now be seen that according to features of the invention, the brake pipe cut-off or double heading valve device 33 and the first service cut-off valve device 34 are of the spool valve type, which is easily operated with a minimum of friction and has suitably spaced O-ring type seals which have proven very effective in providing a positive seal against undesired leakage and in substantially reducing maintenance costs. These valve devices 33, 34 will replace the plug-type cocks heretofore used, because the latter type have been found difficult to operate by reason of the large ports (especially in the double heading cock which has a large port for providing requisite flow capacity from the brake pipe); and also, with the plug type cocks, particles of dirt or grit picked up while in service have resulted in defective sealing, necessitating considerable maintenance.

The improved equalizing valve device 35 is provided for controlling the rate of reduction in brake pipe pressure when the handle 39 of the brake valve device 21 and hence the rotary valve 38 is moved to a first service position and a service position, which positions will hereinafter be defined. The valve device 35 comprises an annular flexible diaphragm 95 suitably clamped about its outer edge between sections of the casing 23 and about its inner edge between portions of a diaphragm follower assemblage 96. The diaphragm 95 is subject at one side to pressure of fluid in a chamber 97 connected via a passage 98 and the pipe 25 to the equalizing reservoir 4; and said diaphragm is subject at the opposite side to pressure of fluid in a chamber 99 that is connected via a baffle choke 100 to a branch of the passage 57. Arranged coaxially with the follower assemblage 96 and suitably connected thereto is a rod 101 which extends from the chamber 97 through a bore 102 in a casing partition and projects into a chamber 103 that is constantly open to a passage 104; said rod carrying an O-ring type seal having sealing and slidable contact with the wall of said bore. Controlling fluid pressure communication between the chamber 103 and a chamber 105 that is open to a branch of the brake pipe passage 57 is a brake pipe discharge check valve 106 that is normally held seated by a spring 107 in the chamber 105; said check valve being arranged coaxially with and adapted to be unseated by the rod 101.

Suitably connected to the follower assemblage 96 is a follower stem 108 which extends from the chamber 99 through a bore 109 in a casing partition and projects into a chamber 110 that is open to another branch of brake pipe passage 57; said stem carrying an O-ring type seal having sealing and slidable contact with the wall of said bore and being adapted at its projecting end to abuttingly engage and unseat a maintaining check valve 111 against resistance of a helical spring 112 in a chamber 113 constantly open to the passage 88 by way of a control choke 114 and a chamber 114a containing a curled hair strainer. Arranged coaxially with the check valve 111 is a rod 115 which extends from chamber 113 and intermediate its ends carries an O-ring type seal having sealing and slidable contact with the wall of an aligned bore in a partition in a bushing 116. The rod 115 projects through this partition into a chamber 117 that is constantly open to the equalizing reservoir 4 via a branch of passage 98; said rod at its projecting end being adapted to unseat a coaxially arranged spill-over check valve 118 against resistance of a spring 119 in a chamber 120 constantly open to another branch of brake pipe passage 57.

When equalizing reservoir pressure in chamber 97 is equal to brake pipe pressure as noted in chamber 99, the diaphragm 95 of equalizing valve device 35 will assume a normal or lap position, in which it is shown, and in which the check valves 106, 111, and 118 are seated.

According to a feature of the invention, the brake pipe flat maintaining valve device 36 is adapted to be manually prepositioned so as to automatically provide (or if preferred, cut out) flat maintaining of brake pipe pressure whenever the brake valve handle 39 is moved to service and lap positions, which positions will be defined subsequently. The valve device 36 comprises a piston 121 slidably mounted in a bore 122 in the casing 23 and subject opposingly to pressure of fluid in a chamber 123 and to pressure of a helical spring 124 in an atmospheric chamber 125. Suitably secured to the piston 121 is a coaxially arranged stem 126 which extends from chamber 125 through a bore in a casing partition 127 and projects into a chamber 128 that is open to a branch of the passage 88; said stem carrying an O-ring type seal having sealing and slidable contact with the wall of said bore and at its projecting end being adapted to abuttingly engage and thereby unseat a coaxially arranged flat maintaining check valve 129 which is normally held seated by pressure of a helical spring 130 in a chamber 131 open to a passage 132.

For controlling pressure of fluid in the chamber 123 there is provided a pilot mechanism substantially similar to that described in connection with the brake pipe cut-off valve device 33 and including a generally cylindrical spool-type pilot valve 133 carrying at least one O-ring type seal having sealing and slidable contact with the wall of a bore 134. The valve 133 is subject at one end to pressure of fluid in a chamber 135 that is open to a passage 136 and also to pressure of a helical bias spring 137 in said chamber; and at its opposite end the valve 133 is operably connected to a pilot handle 138 through the medium of a pivotable thrust element 139, a rotatable cam 140 and a connecting pin 141.

When the pilot handle 138 is in a cut-off position, the cam 140 will operatively hold the pilot valve 133 in a cut-off position, in which it is shown, and in which an elongated annular cavity 142 formed therein connects a passage 143 leading to the chamber 123 with an atmospheric passage 144 for thereby venting said chamber and causing the spring 124 to hold the piston 121 in an upper position and thereby permitting the check valve 129 to be seated by pressure of the spring 130 for preventing flow of fluid under pressure from the chamber 131 to the chamber 128. However, when the handle 138 is moved to a cut-in or maintaining position, the cam 140 will be rotated for permitting the spring 137 to shift the valve 133 upwardly to a maintaining position, in which the cavity 142 is out of registry with the passage 143 and the latter is uncovered past the lower end of the pilot valve 133 to the passage 136 for supplying fluid under pressure to the chamber 123 so as to cause the piston 121 to move downwardly for operatively unseating the check valve 129; it being noted that the aforementioned O-ring seal will prevent leakage along the bore 134 from passages 136 and 143 to atmosphere. Upon unseating of the check valve 129, fluid under pressure will flow via the passage 132 to passage 88 for maintaining brake pipe pressure at the desired reduced pressure against leakage, in the manner and under the conditions hereinafter to be described.

The cut-off valve device 37 is provided for cutting off supply of brake pipe pressure to the rotary valve 38 when brakes are applied in a manner other than by manual operation of the brake valve handle 39; for example, due to a train control, safety control, or trainline emergency brake application. This valve device comprises a generally cylindrical spool-type valve 145 carrying two spaced-apart O-ring type seals having sealing and slidable contact with the wall of a bore in the casing 23. The valve 145 is subject at one end to pressure of fluid in a chamber open to a passage 146 and at the opposite end to pressure of a helical bias spring 147 and to pressure of fluid in a chamber open to a branch of the passage 136. When the pressures of fluid in the passages 146 and 136 are equal, the spring 147 will hold the valve 145 in an open position, in which it is shown, and in which an elongated annular cavity 148 formed in said valve intermediate the O-ring seals connects a branch of brake pipe passage 57 to a branch of the passage 146. However, when pressure of fluid in the passage 136 is reduced below that in passage 146, the valve 145 will be shifted against resistance of spring 147 to a cut-off position for disconnecting the passage 57 from the passage 146.

A feed valve device 149, preferably of the type disclosed in U.S. Patent 2,424,480 granted on July 22, 1947 to McClure and assigned to the assignee of the present invention, is supplied with fluid under pressure via a branch of main reservoir passage 42 and operates to supply to a branch of the passage 132 fluid at a desired reduced pressure corresponding to a normal full charge value of brake pipe pressure. Leading from the feed valve device 149 to the seat of the rotary valve 38 is a control passage 149a.

The brake valve device 21 also comprises the usual timing check valve 150 which provides a split service reduction in brake pipe pressure when, as during a train control brake application, the service application slide valve 47 moves to its application position. This valve 150 normally permits release of fluid under pressure from a passage 151 into a passage 152, but is adapted to be locked down for a preselected period of time for preventing such release when fluid under pressure is supplied from the first suppression reservoir 5 via a passage 153 to a chamber 154 that is open to atmosphere via a timing choke 155; it being noted that pressure thus supplied to chamber 154 acts on a flexible diaphragm 156 which, in turn, shifts a follower 157 downwardly against resistance of a helical spring 158 and into engagement with the timing valve 150 for holding same seated until pressure in chamber 154 has reduced sufficiently to enable the spring 158 to shift the follower upwardly and permit unseating of said timing valve 150.

Since the various valve devices of the improved brake apparatus have now been described, the connections established by the brake valve handle 39 when in a running position and also established by the service application slide valve 47 when in its normal position (in which position it is shown) will be more readily understood and will now be explained.

With the brake valve handle 39 and hence the rotary valve 38 in running position, in which it is shown, the rotary valve chamber 38a is opened to branches of the passages 132 and 146, respectively; said passage 146 having two branches 146a and 146b which lead to the seat of rotary valve 38, and the branch 146b being connected via a cavity 159 in said valve to the control passage 149a. The various branches of a passageway 160 formed in the valve 38 interconnect branch passage 146a, a passage 161, a passage 162 connected via the pipe 27 to the suppression reservoir 10, and a passage 163; and the various branches of another passageway 164 formed in the valve 38 interconnect a passage 165, the passages 92, 152, a passage 166 and an exhaust passage 167. Also a passageway 168 in the valve 38 connects the chamber 38a to the passage 87. The following passages leading to the rotary valve seat will be blanked off by the rotary valve 38: passages 89, 42, 91, 104, and a passage 169 that is open via a service choke 170 to the passage 104, and a passage 171 connected to the pipe 29. The connections established by the rotary valve handle 39 and valve 38 in other positions hereinafter to be described are shown in Fig. 2.

With the service application slide valve 47 in normal position, a cavity 172 therein is exposed solely to the passage 153; a cavity 173 therein connects passage 163 with a passage 174 leading via pipe 26 to the first suppression reservoir 5; a cavity 175 connects a branch of passage 98 with the passage 161; and a cavity 176 connects passage 151 with an exhaust passage 177. Also with the service application slide valve 47 in normal position, a passageway 178 formed therein connects the passage 166 to a branch of the reduction limiting reservoir passage 90; said passageway being connected by way of a choke 179 in said slide valve to the cavity 176 and hence to atmosphere. Also a passageway 180 in slide valve 47 connects a passage 181 leading via a branch of the power knockout pipe 31 to the suppression valve device 9, said passageway 180 being connected to the cavity 176 and hence to atmosphere; and a passageway 182 in said slide valve connects respective branches of the passages 146, 136 for thereby assuring that the cut-off valve 145 of valve device 37 will be maintained in its open position, as shown. The slide valve 47 in normal position also blanks off respective branches of the train control application passage 48 and passage 165.

OPERATION

Charging of the brake apparatus

Assume initially that the main reservoir 2 is charged with fluid under pressure in the usual manner; that the magnet 13 of timing valve device 7 is energized in consequence of a favorable track signal indication; that the handles 66, 80 of the brake pipe cut-off valve device 33 and first service cut-off valve device 34 are in their respective open positions; that the handle 138 of the brake pipe flat maintaining valve device 36 is in cut-off position; and that the handle 39 and hence rotary valve 38 of the brake valve device 21 is in running position. Under these conditions, the various components of the apparatus will be in the respective positions in which they are shown in the drawings.

Fluid under pressure will flow from the main reservoir 2 via the pipe 17 and passage 42 to the chamber 41 of the service application valve device 32 and also at the rate controlled by the choke fitting 44 to the chamber 43, in the usual manner. Since the pilot handle 66 of the brake pipe cut-off valve device 33 is in open position, chamber 52 will be charged with fluid at main reservoir pressure via passage 42, opening 69 and port 70 with the result that the cut-off valve 50 will be in its open position, in which it is shown.

Fluid under pressure will also flow via main reservoir passage 42 to the feed valve device 149 and thence at the desired reduced pressure, corresponding to the desired normal full charge value of brake pipe pressure, to the passage 132 and thence to the rotary valve chamber 38a. Fluid under pressure thus supplied to the chamber 38a will flow via passage 146 and service application slide valve cavity 182 to passage 136; and with fluid pressures thus equalized across the cut-off valve 145, the latter will be maintained in open position by pressure of spring 147, for permitting fluid under pressure to flow via passage 146 and cavity 148 in cut-off valve 145 to passage 57. From passage 57 fluid under pressure will flow via cavity 56 in cut-off valve 50 to passage 58 for charging the brake pipe 1, and from passage 57 fluid under pressure will also flow via baffle choke 100 to chamber 99 in equalizing valve device 35.

Meanwhile, fluid under pressure will also flow from chamber 38a via passage 146, branch passage 146a, and respective branches of the rotary valve passageway 160 to the passage 162 for charging the suppression reservoir 10; to the passage 161 and thence via service slide valve cavity 175 to passage 98 for charging the equalizing reservoir 4 and the chamber 97 of equalizing valve device 35; and to passage 163 and thence via service slide valve cavity 173 to passage 174 for charging the first suppression reservoir 5. Also fluid under pressure will flow from chamber 38a via rotary valve passageway 168 to passage 87 and thence via cavity 84 in the first service spool valve 76 to passage 88 and thence via control choke 114 to chamber 113 of equalizing valve device 35 and also to chamber 128 of maintaining valve device 36. Since, as assumed, the maintaining valve handle 138 is in its cut-off position, in which chamber 123 is vented, the check valve 129 will be seated; however, according to a feature of the invention, if said handle is in its maintaining position during initial charging and chamber 123 is thus charged from passage 136, said check valve 129 will be unseated and permit fluid under pressure from the feed valve device 149 to flow via passage 132 and past unseated valve 129 to passage 88 and thence via choke 114 to chamber 113 of the equalizing valve device 35, so that even if the first service spool valve 76 should be in closed position and thus prevent supply of fluid under pressure to the passage 88 from the passage 87, said passage 88 will nevertheless be charged via the unseated check valve 129 of the maintaining valve device 36. If, as on a long train, brake pipe pressure should build up at a slower rate than equalizing reservoir pressure in chamber 97 and cause the diaphragm 95 to move downwardly and operatively unseat the maintaining check valve 111; and if passage 88 is charged via either valve device 34 or 36, fluid at feed valve pressure will be supplied from passage 88 at the rate controlled by choke 114 to the brake pipe passage 57 for augmenting previously described flow to the brake pipe 1 via the cavity 148 in cut-off valve 145. If equalizing reservoir pressure in chamber 97 should exceed brake pipe pressure by a chosen degree, such as about 2 p.s.i., the diaphragm 95 will deflect downwardly a sufficient extent to unseat the spillover check valve 118 (as well as the check valve 111) for releasing fluid under pressure from the equalizing reservoir 4 into the brake pipe passage 57 until equalizing reservoir pressure is within the illustrative 2 p.s.i. of brake pipe pressure, whereupon said spillover check valve will be reseated.

Also, with brake valve handle 39 and hence rotary valve 38 in running position, one branch of passageway 164 will be connected to exhaust passage 167, with the result that the following will be vented via other branches of said passageway: passage 92 and hence pipe 93 leading to the suppression valve device 9; passage 166 leading via: service slide valve passageway 178 and passage 90 to the reduction limiting reservoir 3; and passage 152 leading to the second reduction reservoir 6.

Since the magnet 13 of timing valve device 7 is energized, the timing reservoir 8 will be charged with fluid under pressure from the main reservoir 2 via previously described communication including the reducing valve device 18 and pipe 14, with the result that said timing valve device will operate to dead-end the pipe 15 which will thus be maintained charged with fluid under pressure supplied via the chamber 43 of service application valve device 32, passage 48, cavity 72 in the brake pipe cut-off pilot spool valve 59 in open position and passage 73.

At the completion of initial charging, all of the components of the brake apparatus will be in the respective positions in which they are shown in the drawing.

Automatic service application of brakes

To effect a service application of brakes on a long freight train, the engineer moves the brake valve handle 39 from running position to first service position for effecting a limited service reduction in brake pipe pressure and hence a light application of brakes on the train to cause a gentle gathering of the slack in the train; whereupon he moves said handle to service position for completing the brake pipe reduction, thereby effecting a so-called split reduction, according to the usual practice.

When handle 39 and hence the rotary valve 38 is moved to first service position (Fig. 2), passage 146 is lapped by said valve for cutting off flow of fluid at feed valve pressure to the brake pipe 1 via the cut-off valve device 37. Also a passageway 183 (Fig. 2) in the rotary valve 38 connects the passages 161 and 89 for causing fluid under pressure to flow from the equalizing reservoir 4 and chamber 97 of equalizing valve device 35 into the previously vented reduction limiting reservoir 3 via passage 98, service slide valve cavity 175, passage 161, passageway 183, passage 89, cavity 85 in the first service spool valve 76, and passage 90; this reduction in equalizing reservoir pressure occurring at a service rate as controlled by a choke 184 (Fig. 2) in said passageway 183. Thus pressure in the equalizing reservoir 4 will equalize into the reduction limiting reservoir 3 at the rate controlled by choke 184 for providing a chosen limited degree of service reduction in equalizing reservoir pressure in the chamber 97 of equalizing valve device 35.

As equalizing reservoir pressure in chamber 97 is thus reduced, brake pipe pressure in chamber 99 will deflect the diaphragm 95 upwardly for operatively unseating the brake pipe discharge check valve 106 through the medium of the rod 101 and thus causing fluid under pressure to flow from the brake pipe passage 57 via passage 104 and the service choke 170 to passage 169, which is then connected via the rotary valve 38 to the exhaust passage 167; said choke providing a service rate of reduction in brake pipe pressure. When brake pipe pressure in chamber 99 has thus reduced to substantial equalization with equalizing reservoir pressure in chamber 97, the diaphragm 95 will deflect toward its lap position, permitting the spring 107 to urge check valve 106 toward its seat sufficiently to restrict the rate and extent of reduction in brake pipe pressure to substantially the same rate and extent as equalizing reservoir pressure is being reduced. Thus the equalizing valve device 35 operates to accomplish an automatic reduction in brake pipe pressure at a controlled rate regardless of the length of the train.

It will be noted that, with the service slide valve 47 in normal position, the reduction limiting reservoir passage 90 is also open to atmosphere by way of the so-called fading choke 179 in said slide valve. This choke 179 is of very restricted flow capacity to provide for a continued reduction in equalizing reservoir pressure and hence in brake pipe pressure so that after the first service reduction, brakes will be very gradually applied if the brake valve handle 39 is left in first service position. Although the continuous venting of passage 90 via the choke 179 may prevent full seating of the discharge check valve 106, the latter will in any event operate to restrict the rate of such continued reduction in brake pipe pressure to the rate at which equalizing reservoir pressure is reduced via said choke.

If there is leakage of fluid under pressure from the brake pipe 1 and consequently from the chamber 99 of the equalizing valve device 35, the diaphragm 95 will operate to limit the extent of opening of the discharge valve 106 so that brake pipe pressure will not reduce at a rate exceeding the reduction in equalizing reservoir pressure in chamber 97. But if brake pipe leakage is such as to reduce brake pipe pressure at a rate exceeding the service rate of reduction in pressure in the equalizing reservoir 4 and chamber 97, as controlled by choke 170, then equalizing reservoir pressure will exceed brake pipe pressure and thus cause the diaphragm 95 to deflect and operatively unseat the maintaining valve 111. With the rotary valve 38 in first service position, fluid at feed valve pressure is supplied via passage 132 and a passageway (Fig. 2) in said rotary valve to passage 87 and thence via cavity 84 of the first service spool valve 76 in open position to the passage 88 and through the air strainer in the chamber 114a and through control choke 114 to the chamber 113. Hence if the maintaining valve 111 should be unseated, fluid at feed valve pressure will be supplied from chamber 113 to the brake pipe passage 57 at the rate controlled by choke 114, for offsetting leakage from the brake pipe 1.

It should be noted that the control choke 114 not only restricts the rate of brake pipe maintaining flow to within the permissible limit of brake pipe leakage as prescribed by the A.A.R. (which limit is 5 p.s.i. per minute), but also restricts the rate of such flow sufficiently to desirably assist propagation of a brake application initiated from the rear of the train by venting of the brake pipe such as will occur in event of pull apart. Also, the diaphragm 95 of the improved equalizing valve device 35, by positively preventing leakage between the chambers 97, 99 (such as could occur if the packing ring of the equalizing piston heretofore used was worn), assures that slack in the train will be gathered gently and at the desired rate.

It should also be noted that the improved apparatus retains the fading maintaining feature of the 24-RL brake equipment; thus, if the first service spool valve 76 is in open position when the brake valve handle 39 is moved to first service position, the equalizing diaphragm 95 will so control selective opening of the discharge valve 106 and maintaining valve 111 as to assure that brake pipe pressure will reduce at substantially the same rate and to same extent as equalizing reservoir pressure, the latter pressure equalizing initially at a service rate into the reduction limiting reservoir 3 via the choke 184 and then reducing at a very restricted rate to atmosphere via the fading choke 179. Moreover, this fading maintaining feature is available in the improved apparatus with the brake valve handle 39 in first service position, irrespective of whether the handle 138 of maintaining valve device 36 is in its cut-off position or its maintaining position.

After slack in the train has been gathered due to the light application of brakes effected by the initial limited reduction in brake pipe pressure, the brake valve handle 39 and hence rotary valve 38 is moved from first service position to service position (Fig. 2) in which passage 87 is lapped off for terminating supply of fluid under pressure thereto and in which the passages 89, 161, 163 and 169 are connected directly to the exhaust passage 167 via branches of a passageway 185 (Fig. 2) in the rotary valve 38. Accordingly, fluid under pressure will be vented from the reduction limiting reservoir 3 via passage 90, cavity 85 in the first service spool valve 76 in its open position, and the vented passage 89; and fluid under pressure will also be vented from the equalizing reservoir 4 and equalizing chamber 97 via passage 98, cavity 175 in the service slide valve 47 in normal position, and the vented passage 161, for providing a further reduction in equalizing reservoir pressure at a service rate as controlled by a service choke 185a (Fig. 2) provided in the passageway 185.

The rotary valve 38 may be allowed to remain in service position until any chosen degree of service reduction, up to a full service reduction, in pressure in the equalizing reservoir 4 and hence chamber 97 has been effected; whereupon the brake valve handle 39 and hence the rotary valve 38 should be moved to lap position, in which passage 161 is lapped off for bottling up fluid under pressure in the equalizing reservoir 4 at the desired reduced pressure and also preventing an unnecessary further reduction in equalizing reservoir pressure. Meanwhile, as equalizing reservoir pressure is reduced, the diaphragm 95 will operate to unseat the discharge valve 106 for releasing fluid under pressure from the brake pipe 1 to a degree corresponding to the chosen degree of reduction in equalizing reservoir pressure, as above explained.

According to the invention, it will be noted (Fig. 2) that in all positions of the rotary valve 38 and handle 39 the feed valve passage 132 is connected to the passage 146. Since the latter passage is connected to the passage 136, via the service slide valve 47 so long as it is in normal position, the passage 136 will be charged with fluid at feed valve pressure which will be available, if the handle 138 of the maintaining valve device 36 is moved to or is in maintaining position, to charge the chamber 123 for causing the piston 121 to move and operatively unseat the maintaining check valve 129 for supplying fluid at feed valve pressure from passage 132 to the passage 88. Hence, if due to leakage of fluid under pressure from the brake pipe 1, brake pipe pressure should reduce at a rate exceeding the service rate of reduction as controlled by service choke 170 when the rotary valve 38 is in service position or if brake pipe pressure should reduce below the chosen reduced pressure bottled up in the equalizing reservoir when said rotary valve is in lap position, then the diaphragm 95 of equalizing valve device 35 will be deflected downwardly for unseating the maintaining check valve 111 and permitting fluid at feed valve pressure to flow from passage 88 and at the rate controlled by choke 114 to the passage 57 and brake pipe for offsetting such leakage.

It will be noted that while equalizing reservoir pressure is being reduced, as in the service position of the rotary valve 38, the check valve 111 will be opened an extent dependent upon the rate of brake pipe leakage and will supply only sufficient fluid under pressure to the brake pipe to prevent brake pipe pressure from reducing at a rate exceeding the service rate of reduction in equalizing reservoir pressure. When fluid is bottled up in the equalizing reservoir 4 at the desired reduced pressure, as in the lap position of the rotary valve 38, the check valve 111 will operate to maintain brake pipe pressure substantially equal to equalizing reservoir pressure and thereby prevent brake pipe leakage from causing a gradual increase in the degree of brake application throughout the train.

It is to be noted that this so-called flat maintaining feature, which is available in the service and lap positions of the rotary valve 38, is optional and may be cut in or cut out at any time merely by actuating the handle 138 of the flat maintaining valve device 36 to maintaining or to cut-off position. Thus the engineer may preselect or vary cut-in or cut-out of this feature according to existing operating conditions. By thus embodying this flat maintaining feature, the improved brake apparatus provides definite advantages in operation both on grades and in level areas. Flat maintaining during braking on grades will necessitate a minimum number of brake applications and thus conserve air; for as will be understood by those familiar with brake apparatus of this type, if it becomes necessary to reduce the degree of a brake application, due for instance to a gradual and undesired increase in such application resultant from brake pipe leakage, the brake application will in effect have to be released and the brakes reapplied to the desired reduced degree, which of course may be dangerous on a long grade. Moreover, flat maintaining will provide more uniform braking throughout the train, thereby more uniformly equalizing brake shoe wear and eliminating stops for wheel cooling. Furthermore, the brake valve handle 39 may be left in lap position indefinitely without the brakes leaking on, due to brake pipe leakage, and thereby causing undesired retardation of the train. Also recharging time will be reduced following a brake application, and release of brakes will be more rapid and uniform throughout the train because a substantially uniform brake pipe pressure gradient will have been maintained during the preceding brake application.

*Release of brakes after an automatic service application*

To effect a release of brakes, the brake valve handle 39 and hence the rotary valve 38 is moved to release position (Fig. 2) for establishing substantially the same fluid pressure connections as in running position, but providing a greater flow rate of fluid under pressure from the feed valve passage 132 to the rotary valve chamber 38a for more rapidly recharging the apparatus via the same communications as fully described in connection with initial charging. After a period of time the brake valve handle 39 is moved from release to running position, in accordance with the usual practice; whereupon charging will continue at a slower rate until the brake pipe, equalizing reservoir 4. and the suppression reservoirs 5 and 10 are charged to the normal full charge value of brake pipe pressure, as heretofore described. The diaphragm 95 of equalizing valve device 35 will operate in the same manner as heretofore described in connection with initial charging to effect unseating of the maintaining check valve 111 (or of both the latter and the spillover check valve 118) so that brake pipe pressure and equalizing reservoir pressure will build up at substantially uniform rates.

*Automatic train control application of brakes*

Assume that the rotary valve 38 is in running position, and that the other components of the brake apparatus are in the respective positions in which they are shown in the drawings. Assume now that the magnet 13 of the timing valve device 7 becomes deenergized in response to an unfavorable traffic signal; that the engineer fails to move the handle 39 to such as the first service or service position for applying brakes, and that in consequence thereof the timing valve device operates, in the manner heretofore described, to connect the train control application pipe 15 to the pipe 16. Under this condition, fluid under pressure will be vented from the chamber 43 of service application valve device 32 to atmosphere via passage 48, spool valve cavity 72 of the brake pipe cut-off valve device 33, passage 73, pipe 15 and the timing valve device 7, to pipe 16, whence it will flow to the suppression valve device 9 and thence, via communication fully disclosed in the patent first mentioned above, through pipe 20, passage 165, rotary valve passageway 164 and exhaust passage 167 to atmosphere. As fluid under pressure is thus vented from chamber 43, the diaphragm 40 will be deflected against pressure of the heavy spring 45 by main reservoir pressure in chamber 41 for shifting the slide valve 47 to its application position, in which a branch of passage 165 is connected via the passageway 182 in said slide valve to a branch of train control application passage 48 for independently venting said passage 48 and thereby maintaining the slide valve 47 in application position so long as the brake valve handle 39 is in running position, even if the timing valve magnet 13 should again become energized and thereby operate to close off said passage 48 and pipe 15 from the vented pipe 16. Hence a train control brake application, once initiated, cannot be interrupted even if a favorable traffic signal causes reenergization of the timing valve magnet 13.

Also with the slide valve 47 in application position, passages 161, 146, 166 and 163 are blanked off at the slide valve seat; and passage 136, connected to the piston chamber of cut-off valve device 37, is vented via slide valve passageway 180 to atmospheric passage 177, with the result that fluid pressure in passage 146 will shift the cut-off valve 145 to its cut-off position for cutting off flow of fluid at feed valve pressure from passage 146 to the passage 57 leading to the brake pipe 1.

If, when the passage 136 is thus vented, the handle 138 of the maintaining valve device 36 should be in its maintaining position, the chamber 123 will be vented via said passage 136 and result in seating of the maintaining check valve 129 for automatically cutting off the supply of fluid at feed valve pressure to passage 88 and thus cutting out the flat maintaining feature so long as the service slide valve 47 is in application position. This is deemed desirable for reasons of train safety.

Also, when the slide valve 47 moves to application position, fluid under pressure will flow from the first suppression reservoir 5 via passage 174, slide valve cavity 172, and passage 153 to chamber 154 for causing diaphragm 156 to deflect and operatively hold the timing valve 150 seated until pressure in said chamber 154 has blown down sufficiently via vent choke 155 to permit spring 158 to deflect said diaphragm upward to permit unseating of said timing valve. Meanwhile, fluid under pressure will also flow from the equalizing reservoir 4 and equalizing chamber 97 via the passage 98, slide valve cavity 175, and a service choke 186 and a cavity 187 in slide valve 47, to passage 90 leading to the reduction limiting reservoir 3 and will also flow via said cavity 187 to the passage 151. Thus pressure in the equalizing reservoir 4 will immediately start to equalize into the reduction limiting reservoir 3 at a service rate, as controlled by the choke 186, for effecting an initial limited reduction in equalizing reservoir pressure of a chosen degree, such as about 7 p.s.i., sufficient to gently gather the slack in the train; by which time the diaphragm 156 will have operated to unlock the timing valve 150, in the manner just described.

If, after initiation of the train control brake application, the rotary valve 38 is permitted to remain in running position, then upon unseating of the timing valve 150 fluid under pressure will be completely vented from the equalizing reservoir 4 via the passage 151, unseated timing valve 150, passage 152, passageway 164 in the rotary valve 38 and exhaust passage 167. If, however, the brake valve handle 39 is moved to lap position, passage 152 will be lapped by the rotary valve 38 and pressure in the equalizing reservoir 4 will equalize into the reduction reservoir 3 and also via the unseated timing valve 150 and passage 152 into the previously vented second reduction reservoir 6 which reduction reservoirs 3, 6 are so proportioned as to provide a full service reduction in equalizing reservoir pressure. As equalizing reservoir pressure is thus reduced, the diaphragm 95 of equalizing valve device 35 will operate to unseat the brake pipe discharge check valve 106 for causing a corresponding full service reduction in brake pipe pressure to thereby effect a full service application of brakes in the same manner as heretofore described, with the following exception. If the rotary valve 38 is in running or release position (Fig. 2), in which passage 169 is lapped at the rotary valve seat, fluid under pressure will be vented from the brake pipe via passage 104, service choke 170, and a branch of said passage 169 which is connected to the atmospheric passage 177 via the cavity 176 of the slide valve 47 when in application position.

Meanwhile, upon movement of the slide valve 47 to application position, fluid at main reservoir pressure is supplied from the chamber 41 via a passageway 188 in said slide valve to passage 181 and thence via one branch of pipe 31 to the aforementioned power knockout device for causing operation of the latter to cut off power on an electric or diesel-electric locomotive and also via another branch of pipe 31 to the suppression valve device 9 for rendering the latter device ineffective to cause an automatic suppression of the train control brake application and assuring that the procedure now to be described must be followed in order to release such an application.

*Release of a train control application of brakes*

In order to release a train control application of brakes, the magnet 13 of timing valve device 7 must be energized in response to a favorable track signal so that said valve device will operate to dead-end pipe 15 and vent the pipe 16. Since the pipe 15 and hence the train control application passage 48 are still vented by way of the so-called lockover passage 165 and the rotary valve 38 in running position, the brake valve handle 39 must be moved to lap position (if not already so moved) and in which position said lockover passage 165 (Fig. 2) is lapped by the rotary valve 38. This permits the chamber 43 of the service application valve device 32 to be effectively charged from the main reservoir passage 42 at the rate controlled by choke fitting 44 with the result that when pressure in said chamber 43 increases sufficiently, the spring 45 will be effective to deflect the diaphragm 40 and thereby shift the slide valve 47 to its previously defined normal position; whereupon the handle 39 should then be returned to running position.

With the rotary valve 38 in running postion and the service application slide valve 47 in normal position, fluid under pressure will again be supplied to passage 136 for shifting the cut-off valve 145 to open position, in which the brake pipe will be recharged via passage 146 to feed valve pressure for causing a complete release of brakes; the equalizing reservoir 4 and the chamber 97 of equalizing valve device 35 and also the first suppression reservoir 5 will be recharged with fluid under pressure; and the reduction reservoirs 3, 6 will be opened to atmosphere, in the same manner as heretofore described in connection with initial charging.

*Suppression of a train control brake application*

It is to be noted that if the engineer fails to heed the warning given by the whistle 19 of timing valve device 7 upon deenergization of the magnet 13 resultant from an unfavorable track signal, the service application valve device 32 will operate automatically to effect a full service application of brakes, for reasons of train safety. If, however, the engineer responds to the warning whistle 19 by effecting a manual application of brakes of a degree sufficient, say, to reduce speed to within that prescribed by the track signal, unnecessary stoppage of the train and unnecessary delay in recharging of the apparatus will be avoided.

Assume now that the engineer on a freight train has responded to the warning whistle 19 by promptly moving the brake valve handle 39 and rotary valve 38 to, for example, first service position for effecting a limited reduction in equalizing reservoir pressure and hence in brake pipe pressure in the manner already described. With rotary valve 38 in first service position, passage 163 (which leads to the previously charged first or temporary suppression reservoir 5 via cavity 173 of slide valve 47 in normal position and passage 174) is connected by way of a passageway 189 (Fig. 2) in said rotary valve to the passage 91 which, in turn, is connected to passage 92 via the cavity 86 of first service spool valve 76 in open position. Thus fluid under pressure will flow from the first suppression reservoir 5 to passage 92 and thence via pipe 93 to the suppression valve device 9, causing operation of the latter, in the manner fully described in the patent first mentioned above, to temporarily close off the pipe 16 from the stop reservoir 11 and pipe 20, and by thus dead-ending the pipe 16 prevent venting of fluid under pressure from the pipe 15 when the timing valve device 7 operates to connect said pipe 15 to pipe 16 in the manner earlier described; and it will thus be seen that operation of the service application slide valve 47 from its normal position to its application position will be prevented, at least temporarily. However, the pipe 93 and hence the first suppression reservoir 5 will also be open by way of the suppression valve device 9 to a restricted exhaust communication (not shown) through which pressure in said reservoir will blow down at a sufficiently restricted rate to permit completion of a first service reduction in brake pipe pressure, following which the engineer must promptly move the handle 39 and rotary valve 38 to service position. Unless this is done, the pressure in the reservoir 5 will blow down sufficiently to cause the suppression valve device 9 to connect pipe 16 and hence pipe 15 to the pipe 20 and passage 165, which passage is connected to atmosphere (Fig. 2) via passageway 164 in the rotary valve 38 in first service position; and if this should occur, a train control brake application will be effected in the manner above described.

Assume now that promptly after completion of the first service reduction in brake pipe pressure, the engineer moves the handle 39 and rotary valve 38 from first service position to service position for effecting a full service reduction in brake pipe pressure in the manner already described. With rotary valve 38 in service position, a cavity 190 therein connects passage 104 to passage 171 for permitting fluid under pressure discharged from the brake pipe via the brake pipe discharge valve 106 to flow via pipe 29 to the suppression valve device 9 and thence at a restricted rate to the timing reservoir 12 for charging the latter. It will be noted that meanwhile fluid under pressure is being vented from the passage 104 via the service choke 170, passage 169, rotary valve 38 and exhaust passage 167 (Fig. 2); but such release via said service choke is at a sufficiently slow rate as to permit said timing reservoir to be effectively charged. The suppression valve device 9 responds to charging of the timing reservoir 12 by maintaining the pipe 16 disconnected from the pipe 20. When the handle 39 and rotary valve 38 are moved to lap position, upon completion of the full service reduction in brake pipe pressure, fluid at feed valve pressure supplied to the permanent suppression reservoir 10 via passage 162 when the rotary valve 38 was in running position and bottled up in said reservoir when said valve is in first service, service and lap positions, will be effective to permanently suppress a train control brake application, it being noted that unless and until a full service reduction in brake pipe pressure has been effected, pressure in the suppression reservoir 10 will not be effective to provide such permanent suppression.

When the track signal becomes favorable and the magnet 13 of timing valve device 7 becomes reenergized, the handle 39 and rotary valve 38 may be moved to release or running position for recharging the brake pipe in the manner already described.

It will now be apparent that when the brake valve handle 39 and rotary valve 38 are moved to first service position, fluid under pressure in the first suppression reservoir 5 will be effective to temporarily suppress a train control brake application; when the rotary valve 38 is thereafter moved to service position, pressure of fluid supplied to the timing reservoir 12 will be effective to temporarily suppress a train control brake application; such suppressions being temporary because pressure in the reservoirs 5, 12 will blow down at controlled rates. But when a full service reduction in brake pipe pressure is effected, pressure of fluid in the permanent suppression reservoir 10 will be effective to permanently suppress a train control brake application and the handle 39 and rotary valve 38 should then be moved to lap position to prevent unnecessary loss of air from the brake pipe and a consequent increase in brake pipe recharging time. If more specific detail as to the structure and operation of the suppression valve device 9 is desired, the reader is referred to the patent first mentioned above. For purposes of the present invention, however, it is sufficient that the reader bear in mind that the suppression valve device 9 effects a temporary suppression of a train control brake application when fluid under pressure is supplied thereto from the first or temporary suppression reservoir 5 when the rotary valve 38 is in first service position, and that said reservoir will be recharged with fluid under pressure when said rotary valve is in running position.

According to a feature of the invention, the brake valve device 21 is provided with the passage 91 which is connected to the passage 92 leading to suppression valve device 9 only when the first service spool valve 76 is in its first service or open position, for thereby preventing supply of fluid under pressure from the suppression reservoir 5 to said suppression valve device 9 if said spool valve is operated to closed position by movement of the handle 80.

In order to more fully understand the nature and importance of this improvement, it should be noted that reports have been received that with brake valve devices of types heretofore proposed, an engineer could improperly suppress a train control brake application by the following unauthorized practice: When the timing valve magnet 13 becomes deenergized due to an unfavorable signal and whistle 19 sounds a warning, the engineer could close the first service valve and thus prevent a first service reduction in brake pipe pressure, but by moving the brake valve handle and thus the rotary valve to first service position he would nevertheless charge the suppression valve device from the first suppression reservoir 5 and thereby effect a temporary suppression. When he noticed from the gage that pressure in the first suppression reservoir 5 had blown down to a certain degree, he could move the brake valve handle to running position to rapidly recharge the first suppression reservoir 5 with fluid at feed valve pressure, no reduction in brake pipe pressure having taken place because the first service valve was closed. With the suppression reservoir 5 recharged, he could then return the brake valve handle to first service position for reconnecting the recharged reservoir 5 to the suppression valve device for extending the "temporary" suppression. By carefully observing the gage, this procedure could be repeated indefinitely and the engineer could advance the train through restricted territory or through a stop signal without applying brakes and hence without reducing speed or making the prescribed stop.

This unauthorized procedure is positively prevented in the improved brake apparatus because, as above noted, if the engineer moves the handle 80 and hence the first service spool valve 76 to closed position, he will prevent supply of fluid under pressure from the first supression reservoir 5 to the suppression valve device 9 and hence he will be unable to suppress a train control brake application. In other words, he can temporarily suppress a train control brake application only by leaving the first service spool valve 76 in open position, with the result that when the brake valve handle 39 is moved to first service position or to serivce position, brake pipe pressure will be effectively reduced by previously described operation of the equalizing valve device 35 and thus effect an application of brakes.

SUMMARY

It will now be seen that the improved fluid pressure brake apparatus comprises a novel, manually operable brake pipe flat maintaining valve device 36 which permits the engineer to preselect or at any time cut in or cut out the flat maintaining feature. With the valve device 36 in its cut-in position, brake pipe pressure will be maintained, against leakage of up to a maximum permissible rate, at the value of pressure in the equalizing reservoir 4 and chamber 97 of equalizing valve device 35 whenever the handle 39 and hence rotary valve 38 of the engineer's automatic brake valve device 21 is in service and lap positions. The improved brake apparatus also provides fading maintaining of brake pipe pressure against leakage when, with the first service spool valve 76 in open position, the brake valve handle 39 is moved to first service position; such fading maintaining being provided irrespective of whether the handle 138 of the maintaining valve device 36 is in its cut-in or cut-off position.

The improved apparatus also embodies a first service cut-off valve device 34 which in closed position disconnects passages 91, 92 so that in such position fluid under pressure cannot be supplied from the first suppression reservoir 5 to the pipe 93 and suppression valve device 9 even though the brake valve handle 39 is moved to first service position; thus an improper suppression of an automatic train control brake application is positively prevented.

The improved apparatus also embodies improved valve devices 33, 34, 35, 37 which operate more easily and with a minimum of friction, and reduce maintenance costs, and also provide more positive sealing than their counterparts as used in equipments heretofore proposed.

Having now described the invention, what I claim as new and desire to secure by Letters Patent, is:

1. A fluid pressure brake apparatus comprising, in combination, a brake pipe, a source of fluid under pressure, an equalizing reservoir, an equalizing valve device comprising one normally closed check valve for controlling venting of fluid under pressure from said brake pipe, another normally closed check valve controlling communication between a first chamber and said brake pipe, and movable abutment means subject opposingly to pressures of fluid in said equalizing reservoir and brake pipe and responsive to a reduction in equalizing reservoir pressure below that in said brake pipe to open said one check valve and operative if brake pipe pressure is less than equalizing reservoir pressure to open said other check valve, a reduction limiting reservoir, a brake valve device comprising a manually operable valve having one position for charging said equalizing reservoir and brake pipe and also venting said reduction limiting reservoir, a first service position for opening said equalizing reservoir to said reduction limiting reservoir, another service position for venting fluid under pressure from said equalizing reservoir directly to atmosphere, and a lap position for bottling up fluid under pressure in said equalizing reservoir, said manually operable valve being operative only in its one and first service positions to supply fluid under pressure to said first chamber, and a brake pipe flat maintaining valve device comprising means responsive to charging of a second chamber to supply fluid under pressure from said source to said first chamber in by-pass of said manually operable valve and responsive to venting of said second chamber to terminate such supply, and also comprising a manually operable pilot valve having one position for supplying fluid under pressure to said second chamber and another position for venting said second chamber.

2. A fluid pressure brake apparatus comprising, in combination, a brake pipe, a feed valve device for providing fluid at a chosen pressure, an equalizing reservoir normally charged with fluid at said chosen pressure, a normally closed restricted release communication, an equalizing valve device comprising one normally closed check valve for controlling release of fluid under pressure from said brake pipe into said release communication, another normally closed check valve controlling communication between a first chamber and said brake pipe, and movable abutment means subject opposingly to pressures of fluid in said equalizing reservoir and brake pipe and operative upon a reduction in equalizing reservoir pressure below that in said brake pipe to open said one check valve and operative if brake pipe pressure is less than equalizing reservoir pressure to open said other check valve, a brake pipe charging communication normally charged with fluid at said chosen pressure, a normally vented reduction limiting reservoir, a normally charged application pipe, a passage, a service application valve device biased to a normal position for connecting a branch of said charging communication to said passage and closing said release communication and automatically operable to an application position upon venting of said application pipe to disconnect said charging communication from said passage and vent the latter and also establish a restricted communication between said equalizing reservoir and said reduction limiting reservoir and open said release communication, a cut-off valve subject opposingly to pressures of fluid in said charging communication and passage and operative when such opposing pressures are equal to connect said charging communication to said brake pipe and operative to disestablish such connection upon venting of said passage, and a brake pipe flat maintaining valve device comprising a movable abutment responsive to charging of a second chamber to effect supply of fluid under pressure from said feed valve device to said first chamber and responsive to venting of said second chamber to cause termination of such supply, and also comprising a manually operable pilot valve operative in one position to connect said passage to said second chamber and in another position to disestablish such connection and vent said second chamber, such that operation of said service application valve device to application position at a time when said pilot valve is in said one position will automatically cause said cut-off value to operate to effect termination of supply of fluid under pressure to said second chamber and hence to said first chamber.

3. A fluid pressure brake apparatus comprising a normally charged equalizing reservoir, a normally vented reduction limiting reservoir, a normally charged temporary suppression reservoir, suppression valve means operative upon the supply of fluid under pressure thereto from said temporary suppression reservoir to suppress an automatic train control application of brakes for a predetermined period, manually controlled first service cut-off valve means controlling two communications and having one position for opening said communications, a brake valve device operable to a first service position for causing fluid pressure in said equalizing reservoir to equalize into said reduction limiting reservoir by flow via one of said communications and for also supplying fluid under pressure from said temporary suppression reservoir to said suppression valve means by flow via the other of said communications, said first service cut-off valve means having another position for concurrently closing said communications, whereby operation of said brake valve device to first service position will be ineffective to provide such supply of fluid under pressure from said temporary suppression reservoir to said suppression valve means unless said first service cut-off valve means is in its said one position.

4. A fluid pressure brake apparatus comprising in combination, a brake pipe, an equalizing reservoir, valve means operative whenever fluid pressure in said brake pipe is less than that in said equalizing reservoir to open a chamber to said brake pipe, a reduction limiting reservoir, a temporary suppression reservoir, suppression valve means responsive to pressure of fluid supplied thereto from said temporary suppression reservoir to suppress a train control application of brakes, a first passage, a second passage, a third passage, manually controlled first service cut-off valve means having one position for connecting said first passage to said chamber, said second passage to said redutcion limiting reservoir, and said third passage to said suppression valve means and having another position for disestablishing such connections, and a brake valve device comprising a valve having one position for charging said brake pipe and equalizing reservoir and temporary suppression reservoir and first passage with fluid under pressure and also venting said reduction limiting reservoir and lapping said second and third passages, and operable to a first service position for supplying fluid under pressure to said first passage and opening said equalizing reservoir to said second passage and opening said temporary suppression reservoir to said third passage.

5. The combination according to claim 4, including a source of fluid under pressure, and brake pipe flat maintaining valve means actuated by movement of a handle to one position to supply fluid under pressure from said source directly to said chamber in by-pass of said valve and by movement of the handle to another position to terminate such supply.

6. The combination according to claim 4, further characterized in that said first service cut-off valve means comprises a generally cylindrical valve element having three spaced annular cavities therein, sealing rings carried by said valve element for sealingly isolating said cavities from each other and from the respective ends of said valve element, said rings having sealing slidable contact with the wall of a bore in which said valve element is mounted, one of said cavities controlling connection of said first passage with said chamber, another of said cavities controlling connection of said second passage with said reduction limiting reservoir, and the third of said cavities controlling connection of said third passage with said suppression valve means, bias means acting on one end of said valve element, and manually rotatable cam means acting on the opposite end of said valve element and cooperable with said bias means for controlling positioning of said valve element.

7. The combination according to claim 4, wherein said valve of said brake valve device is a rotary, and including a source of fluid under pressure, another passage, a cut-off valve interposed between said rotary valve and brake pipe and normally opening a certain communication between said rotary valve and brake pipe and responsive to venting of said other passage to close said certain communication, valve means normally connecting said other passage to the branch of said certain communication leading to said rotary valve and operative upon initiation of an automatic train control application of brakes to disconnect said branch from said other passage and vent the latter, and another valve device comprising means responsive to charging of a second chamber with fluid under pressure to supply fluid under pressure from said source to the first named chamber in bypass of said rotary valve and responsive to venting of said second chamber to terminate such supply, and manually controlled pilot mechanism operable in one position to connect said other passage to said second chamber and in another position to disestablish such connection, whereby supply from said source to said first named chamber via said other valve device will be terminated automatically if said other passage is vented at a time when said pilot mechanism is in its said one position.

8. In a fluid pressure brake apparatus of the type comprising a source of fluid under pressure and an equalizing valve device comprising means responsive to a reduction in pressure in a brake pipe below that in an equalizing reservoir to open a maintaining communication to said brake pipe: a brake pipe flat maintaining valve device comprising, in combination, a normally closed check valve controlling supply of fluid under pressure from the source to the maintaining communication, a movable abutment arranged coaxially with said check valve and responsive to charging of a chamber to move to one position for opening said check valve and responsive to venting of said chamber to move to another position for permitting closure of said check valve, a pilot valve having one position for supplying fluid under pressure to said chamber and another position for venting said chamber, and means manually operable for controlling positioning of said pilot valve.

9. In a fluid pressure brake apparatus, the combination of a brake pipe, an equalizing reservoir, a maintaining communication which is adapted to be charged with fluid under pressure, choke means, and an equalizing valve device comprising a brake pipe discharge check valve for venting fluid under pressure from said brake pipe, a maintaining check valve for permitting flow from said maintaining communication to said brake pipe at the rate controlled by said choke means, a spillover check valve for connecting said equalizing reservoir to said brake pipe, and a diaphragm subject opposingly to pressures of fluid in said equalizing reservoir and brake pipe, all of said check valves being arranged coaxially with said diaphragm, said diaphragm being adapted to assume a neutral position when such opposing pressures acting thereon are equal and in which position all of said check valves are closed, said diaphragm being movable in one direction from said neutral position in response to a reduction in equalizing reservoir pressure below that in said brake pipe for opening said discharge check valve and movable in the opposite direction from said one position when equalizing reservoir pressure exceeds brake pipe pressure for opening said maintaining check valve and movable further in said opposite direction for additionally opening said spillover check valve if equalizing reservoir pressure exceeds brake pipe pressure by more than a chosen degree.

10. In a fluid pressure brake apparatus, the combination, of a brake pipe, a brake pipe passage through which fluid under pressure may normally be conveyed to and released from said brake pipe, a source of fluid under pressure, an application passage venting of which will cause an automatic application of brakes, an application pipe, and a brake pipe cut-off valve device comprising a generally cylindrical cut-off valve having an annular cavity intermediate its ends, sealing rings carried by said cut-off valve at each side of said cavity and having sealing slidable contact with the wall of a bore in which said cut-off valve is mounted, bias means, said cut-off valve being subject opposingly to pressure of fluid in a chamber and to pressure of said bias means and responsive to pressure of fluid in said chamber to normally connect said brake pipe passage to said brake pipe via said cavity and responsive to venting of said chamber to disestablish such connection for preventing the pressure of fluid in said brake pipe passage from influencing the pressure in said brake pipe, a generally cylindrical manually operable pilot valve having a plurality of spaced openings, sealing rings carried by said pilot valve and having sealing slidable contact with the wall of another bore and so spaced as to sealingly isolate said openings from each other, said pilot valve having a closed position in which said openings are so positioned as to disconnect said application passage from said application pipe and vent said chamber, and operable therefrom to an intermediate position in which said openings are so positioned as to charge said application pipe with fluid under pressure from said source while maintaining said application pipe disconnected from said application passage and also maintaining said chamber vented, and operable from said intermediate position to an open position in which said openings are so positioned as to disconnect said application pipe and connect the latter to said application passage and also supply fluid under pressure from said source to said chamber.

11. A fluid pressure brake apparatus comprising, in combination, a brake pipe, a source of fluid under pressure, an application passage, an application pipe from which fluid under pressure is adapted to be released upon the existence of a certain condition for causing an automatic application of brakes, a service application valve device comprising valve means controlled by opposing pressures of fluid in two chambers, one of said chambers being open to said application passage and charged at a more restricted rate from said source than is the other of said chambers, said valve means normally being in a normal position and movable therefrom to an application position only upon venting of said one chamber by way of said application passage, a brake pipe passage variation in the pressure of fluid in which normally effects corresponding variations in pressure of fluid in said brake pipe, and a brake pipe cut-off valve device comprising first bias means, a spool-type cut-off valve subject opposingly to pressure of fluid in a third chamber and to pressure of said bias means and responsive to charging of said third chamber to connect said brake pipe passage to said brake pipe and responsive to venting of said third chamber to disestablish such connection, a pilot spool valve having an open position in which fluid under pressure is supplied from said source to said third chamber and in which said application passage is connected to said application pipe, and having a closed position in which said third chamber is vented and said application passage is disconnected from said application pipe, and also having a position intermediate said open and closed positions in which fluid under pressure is supplied from said source to said application pipe and the latter is disconnected from said application passage and said third chamber is vented, second bias means acting on one end of said spool valve, a cam operably engaging the opposite end of said spool valve, and manually operable means for controlling positioning of said cam and cooperable with said second bias means for thereby controlling positioning of said spool valve.

12. A fluid pressure brake apparatus comprising, in combination, a brake pipe, an equalizing reservoir, a source containing fluid at the normal charge value of brake pipe pressure, a normally vented reduction limiting reservoir, valve means controlled by equalizing reservoir pressure opposing brake pipe pressure and responsive to a reduction in brake pipe pressure below equalizing reservoir pressure to connect a chamber to the brake pipe, a first operator-controlled valve device having one position for connecting said chamber to said source and another position for disconnecting said chamber from said source, and a second operator-controlled valve device manually operable independently of said first operator-controlled valve device and having one position for charging said brake pipe and equalizing reservoir from said source and having a first service position for disconnecting said brake pipe and equalizing reservoir from said source and connecting said equalizing reservoir to said reduction limiting reservoir in bypass of said first operator-controlled valve device.

14. A fluid pressure brake apparatus comprising, in combination, a brake pipe, an equalizing reservoir, a source containing fluid under pressure, a first operator-controlled valve device having one position for connecting a chamber to said source and another position for disestablishing such connection, a reduction limiting reservoir, a first choke providing a very restricted connection of the reduction limiting reservoir with the atmosphere, a second choke of greater flow capacity than said first choke, a second operator-controlled valve device operable independently of said first operator-controlled valve device and operative to one position for concurrently charging the brake pipe and equalizing reservoir with fluid under pressure from said source, and operative to a first service position for disconnecting the brake pipe and equalizing reservoir from said source and connecting said equalizing reservoir to said reduction limiting reservoir in bypass of said first operator-controlled valve device, and operative to a service position for cutting off said reduction limiting reservoir from said equalizing reservoir and opening the latter directly to atmosphere in bypass of said first operator-controlled valve device and via said second choke for effecting a desired reduction in equalizing reservoir pressure, and operative to a lap position for bottling up fluid in the equalizing reservoir at a desired reduced pressure while continuing to maintain the brake pipe cut off from said source, and valve means controlled by brake pipe pressure opposing equalizing reservoir pressure and responsive to a reduction in equalizing reservoir pressure as effected by said second operator-controlled valve device to cause a corresponding reduction in brake pipe pressure and responsive to a reduction in brake pipe pressure below equalizing reservoir pressure to establish a brake pipe maintaining connection between the chamber and the brake pipe, whereby with said first operator-controlled valve device continually positioned in its said one position brake pipe pressure will be automatically maintained against leakage below the value of equalizing reservoir pressure while said second operator-controlled valve device is in its said first service, service and lap positions.

References Cited in the file of this patent
UNITED STATES PATENTS

| | | |
|---|---|---|
| 2,055,105 | Hewitt | Sept. 22, 1936 |
| 2,322,042 | McClure | June 15, 1943 |